(12) United States Patent
Machado et al.

(10) Patent No.: US 11,858,547 B2
(45) Date of Patent: Jan. 2, 2024

(54) INTERMEDIATE SHAFT ASSEMBLY FOR STEERING COLUMN

(71) Applicant: Schaeffler Technologies AG & Co. KG, Herzogenaurach (DE)

(72) Inventors: Elias Ferreira Machado, Sorocaba (BR); Kleberson Sierra, Sorocaba (BR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 131 days.

(21) Appl. No.: 17/484,497

(22) Filed: Sep. 24, 2021

(65) Prior Publication Data

US 2023/0114883 A1    Apr. 13, 2023

(51) Int. Cl.
  *B62D 1/185*    (2006.01)
  *B62D 1/184*    (2006.01)
  *F16C 29/04*    (2006.01)
  *F16C 3/035*    (2006.01)

(52) U.S. Cl.
  CPC ............. *B62D 1/185* (2013.01); *B62D 1/184* (2013.01); *F16C 3/035* (2013.01); *F16C 29/046* (2013.01); *F16C 2326/24* (2013.01)

(58) Field of Classification Search
  CPC ......... B62D 1/185; B62D 1/184; F16C 3/035; F16C 29/046; F16C 2326/24
  See application file for complete search history.

(56) References Cited

U.S. PATENT DOCUMENTS

| 5,640,884 | A | * | 6/1997 | Fujiu | B62D 1/192 74/492 |
| 6,241,616 | B1 | * | 6/2001 | Lightcap | F16C 3/03 464/158 |
| 7,975,569 | B2 | | 7/2011 | Klos | |
| 9,157,482 | B2 | * | 10/2015 | Vasicek | B62D 1/20 |
| 2009/0270188 | A1 | | 10/2009 | Yamada et al. | |
| 2017/0356487 | A1 | | 12/2017 | Müntener et al. | |
| 2019/0195271 | A1 | | 6/2019 | Breuer et al. | |

FOREIGN PATENT DOCUMENTS

| CN | 107000014 | A | * | 8/2017 | ............. B21D 15/02 |
| CN | 111247049 | A | * | 6/2020 | ............... B62D 1/16 |
| DE | 4407310 | A1 | * | 9/1995 | ............ F16C 19/466 |
| DE | 10301082 | B4 | * | 2/2007 | ............. B62D 1/185 |
| DE | 102016215869 | A1 | | 3/2018 | |
| EP | 1070865 | A2 | * | 1/2001 | ............ F16C 29/002 |

(Continued)

*Primary Examiner* — Drew J Brown
(74) *Attorney, Agent, or Firm* — Volpe Koenig P.C.

(57) ABSTRACT

An intermediate shaft assembly for a steering column is disclosed herein. The assembly includes a first shaft defining a cavity and a first bearing raceway, a second shaft arranged at least partially within the cavity of the first shaft, a sleeve arranged on an axial end of the second shaft and defining a second bearing raceway, and a bearing assembly including at least two rows of rolling elements and a cage. The rolling elements are supported between the first bearing raceway of the first shaft and the second bearing raceway of the sleeve. The sleeve can be heat treated, and formed from sheet metal. The sleeve can be secured to the axial end of the second shaft by a direct rotational connection such that the sleeve is rotationally fixed to the second shaft.

20 Claims, 4 Drawing Sheets

(56) References Cited

FOREIGN PATENT DOCUMENTS

| | | | |
|---|---|---|---|
| JP | 2005195120 A | 7/2005 | |
| JP | 2011117496 A | 6/2011 | |
| KR | 20-1998-0068206 U | 12/1998 | |
| KR | 10-2003-0016036 A | 2/2003 | |
| KR | 10-2014-0105269 A | 9/2014 | |
| KR | 10-2019-0027469 A | 3/2019 | |
| WO | WO-2004040154 A1 * | 5/2004 | .......... F16C 29/0697 |
| WO | 2011149212 A2 | 12/2011 | |

* cited by examiner

INTERMEDIATE SHAFT ASSEMBLY FOR STEERING COLUMN

FIELD OF INVENTION

The present disclosure is directed to an intermediate shaft assembly for a steering column.

BACKGROUND

It is typical to provide for length compensation of the steering column shaft assemblies due to axial loads experienced by the steering column shaft assemblies. In these known arrangements, a bearing assembly is typically supported between raceways defined directly by two shafts of the assembly. The shafts used in these assemblies can be heat treated during formation processes in order to provide the requisite surface hardness for the rolling element raceways. However, due to the shaft geometry and heat treatment processes, some deformations are known to occur in the rolling element raceway. These deformations are particularly detrimental to the overall assembly because the raceways can become no longer completely linear and hence the radial clearance of the assembly can be out of specification. As a result, the assembly may malfunction during operation, leading to very high axial forces for relative axial displacement of the shaft, or slippage of the rolling elements on the raceways. These issues ultimately decrease the lifespan for the assemblies.

Accordingly, it would be desirable to provide a more reliable and durable intermediate shaft assembly for a steering column.

SUMMARY

In one aspect, an improved intermediate shaft assembly for a steering column is disclosed. The assembly includes a first shaft defining a cavity and a first bearing raceway, and a second shaft arranged at least partially within the cavity of the first shaft. A sleeve is arranged on an axial end of the second shaft and defines a second bearing raceway. A bearing assembly includes at least two rows of rolling elements and a cage. The rolling elements are supported between the first bearing raceway of the first shaft and the second bearing raceway of the sleeve.

A securing element can be provided that is arranged on an axial end of the sleeve that is configured to retain the bearing assembly on the sleeve. In one aspect, the securing element is a snap ring.

In one aspect, the sleeve is heat treated. The sleeve can be formed from sheet metal.

The sleeve is secured to the axial end of the second shaft by an interference fit or direct rotational connection, in one aspect. The interference fit or direct rotational connection is formed via at least one first curved section formed on the second shaft that is configured to mate with at least one second curved section formed on the sleeve such that the second shaft and the sleeve are rotationally connected. The interference fit or direct rotational connection can alternatively be formed via at least one first flat section formed on the second shaft that is configured to mate with at least one second flat section formed on the sleeve such that the second shaft and the sleeve are rotationally connected.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION OF THE PREFERRED EMBODIMENTS

Figure 1:
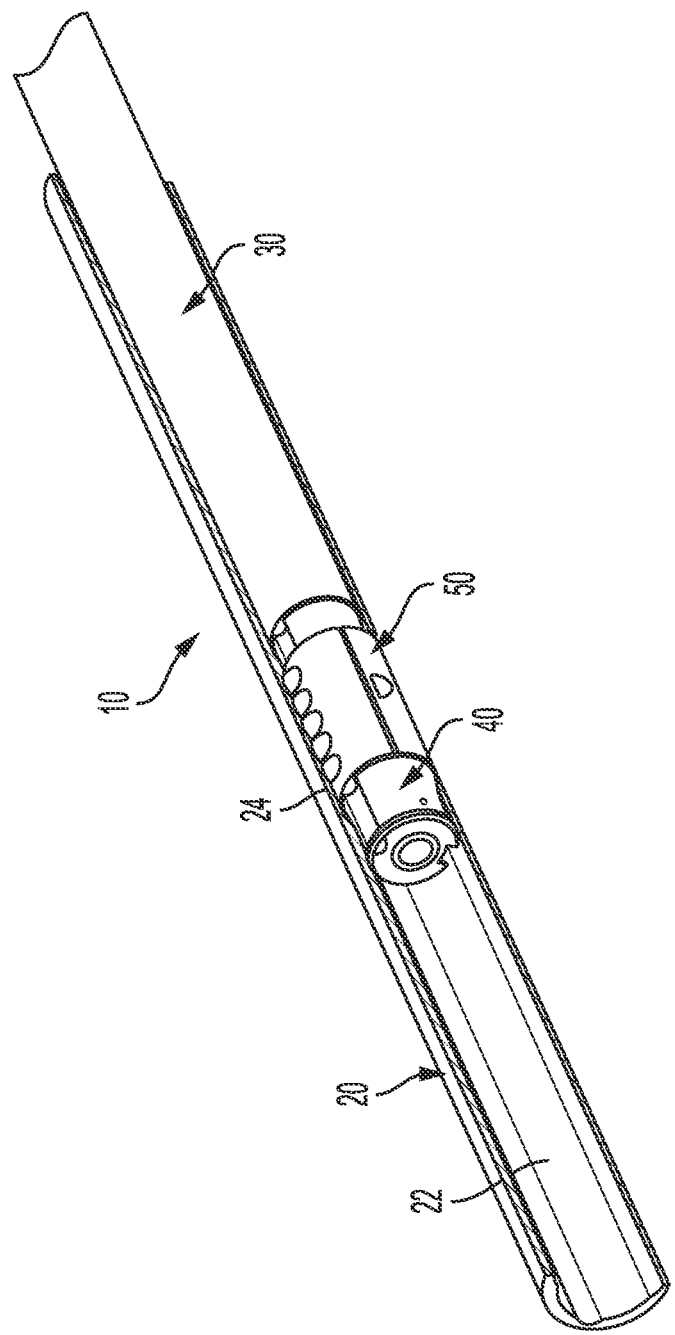
FIG. 1 is a perspective view of an intermediate shaft assembly for a steering column according to one aspect.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 3:
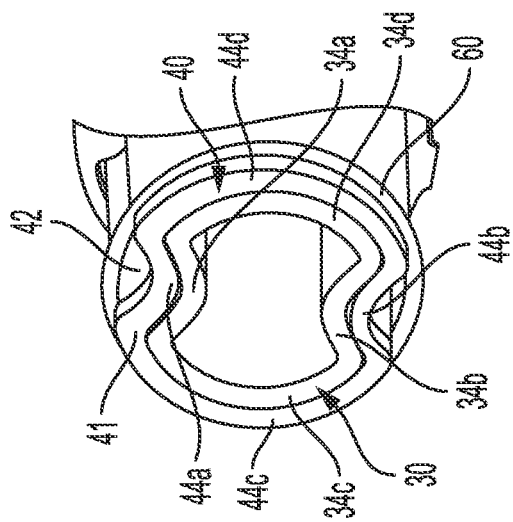
FIG. 3 is a further magnified view of the end of the intermediate shaft assembly of FIGS. 1 and 2.
Figure 2:
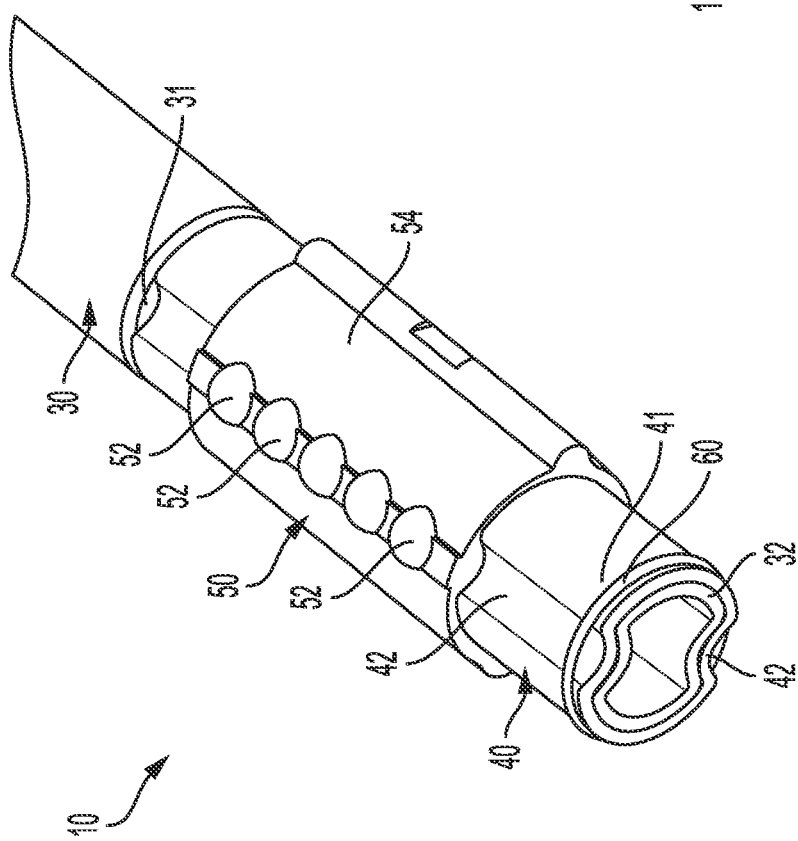
FIG. 2 is a magnified view of an end of the intermediate shaft assembly of FIG. 1.
Figure 6:
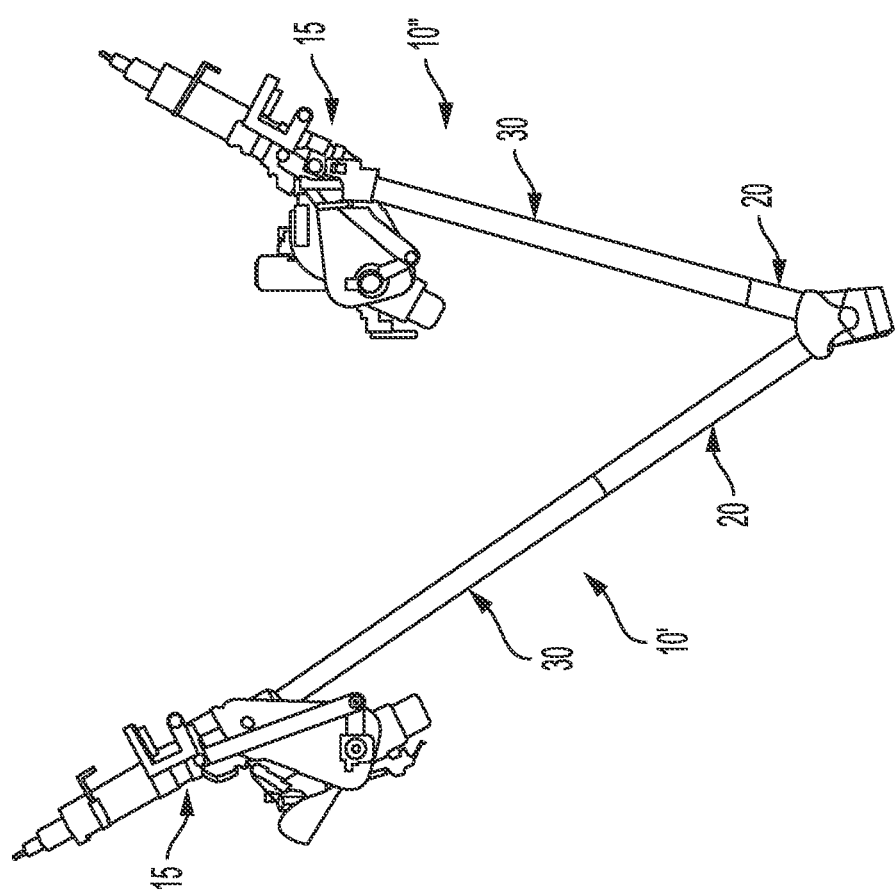
FIG. 6 is a view of the intermediate shaft assembly in two different positions.

As shown in FIGS. 1-3, an intermediate shaft assembly 10 for a steering column is generally disclosed herein. The assembly 10 comprises a first shaft 20 defining a cavity 22 and a first bearing raceway 24. The first bearing raceway 24 can be an external or radially outer raceway. In one aspect, the first shaft 20 is an external tube, and can be configured to be connected to steering column box, as shown in FIG. 6.

A second shaft 30 is also provided that is arranged at least partially within the cavity 22 of the first shaft 20. The second shaft 30 is configured to be connected to a steering wheel assembly 15, as shown in FIG. 6. One of ordinary skill in the art would understand that the second shaft 30 can be configured to be connected to any other steering column assembly component. The second shaft 30 can be configured to be connected to the upper steering column cross piece, which is directly connected to the steering wheel assembly 15.

A sleeve 40 is arranged on an axial end 32 of the second shaft 30 and defines a second bearing raceway 42. The second bearing raceway 42 can be an internal raceway or radially inner raceway. The sleeve 40 is heat treated, in one aspect. The sleeve 40 can be formed from sheet metal, in one aspect. The sleeve 40 is secured to the axial end 32 of the second shaft 30 by an interference fit or direct rotational connection, in one aspect. As used in this context, the term interference fit can refer to a frictional fit or a rotationally locking interference fit. The sleeve 40 can be formed from steel, in one aspect. The sleeve can be formed from a steel tube whereby the internal raceway is formed by stamping or rolling processes.

A bearing assembly 50 is also provided that includes at least two rows of rolling elements 52 and a cage 54 configured to retain the rolling elements 52. The rolling elements 52 are supported between the first bearing raceway 24 of the first shaft 20 and the second bearing raceway 42 of the sleeve 40. The bearing assembly generally allows the first and second shafts 20, 30 to be adjusted in an axial direction relative to each other. This configuration can also for oscillations in the axial direction during driving. Due to the groove profiles of the first bearing raceway 24 and the second bearing raceway 42 and the cage 54, the rolling elements 52 are circumferentially retained and do not allow for rotational motion between the first and second shafts 20, 30.

In one aspect, there are two sets of the first bearing raceway 24 and the second bearing raceway 42. One of ordinary skill in the art would understand that a single raceway could be provided or multiple raceways could be implemented in the assembly.

In one aspect, the assembly 10 further includes a securing element 60 arranged on an axial end 41 of the sleeve 40 configured to retain the bearing assembly on the sleeve 40. The securing element 60 can include a snap ring. One of ordinary skill in the art would understand that other types of securing elements could be used, such as pins, latches, clips, flanges, etc. At an opposite end, a shoulder 31 formed on the second shaft 30 can define an axial stop for the bearing assembly 50.

In one aspect, the sleeve 40 is rotationally fixed to the axial end 32 of the second shaft 30 via a coupling feature, which can include surface profiles defined by the second shaft 30 and the sleeve 40 or a separate locking element. As shown in more detail in FIG. 3, the interference fit or direct rotational connection between the second shaft 30 and the sleeve 40 can be formed via at least one first curved section 34a, 34b formed on the second shaft 30 that is configured to mate with at least one second curved section 44a, 44b formed on the sleeve 40. Circumferential curved sections 34c, 34d and circumferential curved sections 44c, 44d can connect the respective first curved sections 34a, 34b and the second curved sections 44a, 44b. The circumferential curved sections 34c, 34d, 44c, 44d each have a continuously curved profile. The first curved section 34a, 34b and the second curved section 44a, 44b each can include an indented curved profile that generally extends radially inwards. One of ordinary skill in the art would understand based on the present disclosure that various types of circumferentially interlocking, non-rotatable interfaces could be provided between the second shaft 30 and the sleeve 40.

Figure 4:
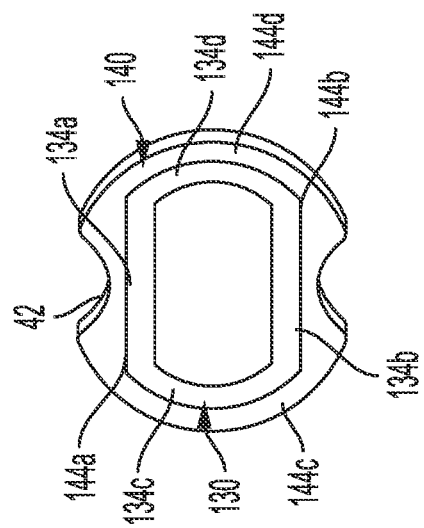
FIG. 4 is a front planar view another aspect of a second shaft and a sleeve for the intermediate shaft assembly.

As shown in FIG. 4, the interference fit or direct rotational connection between the second shaft 130 and the sleeve 140 can be formed via at least one first flat section 134a, 134b formed on the second shaft 130 that is configured to mate with at least one second flat section 144a, 144b formed on the sleeve 140. Continuously curved circumferential sections 134c, 134d can connect flat sections 134a, 134b of the second shaft 130, and a corresponding pair of continuously curved circumferential sections 144c, 144d can connect flat sections 144a, 144b of the sleeve 140.

Figure 5:
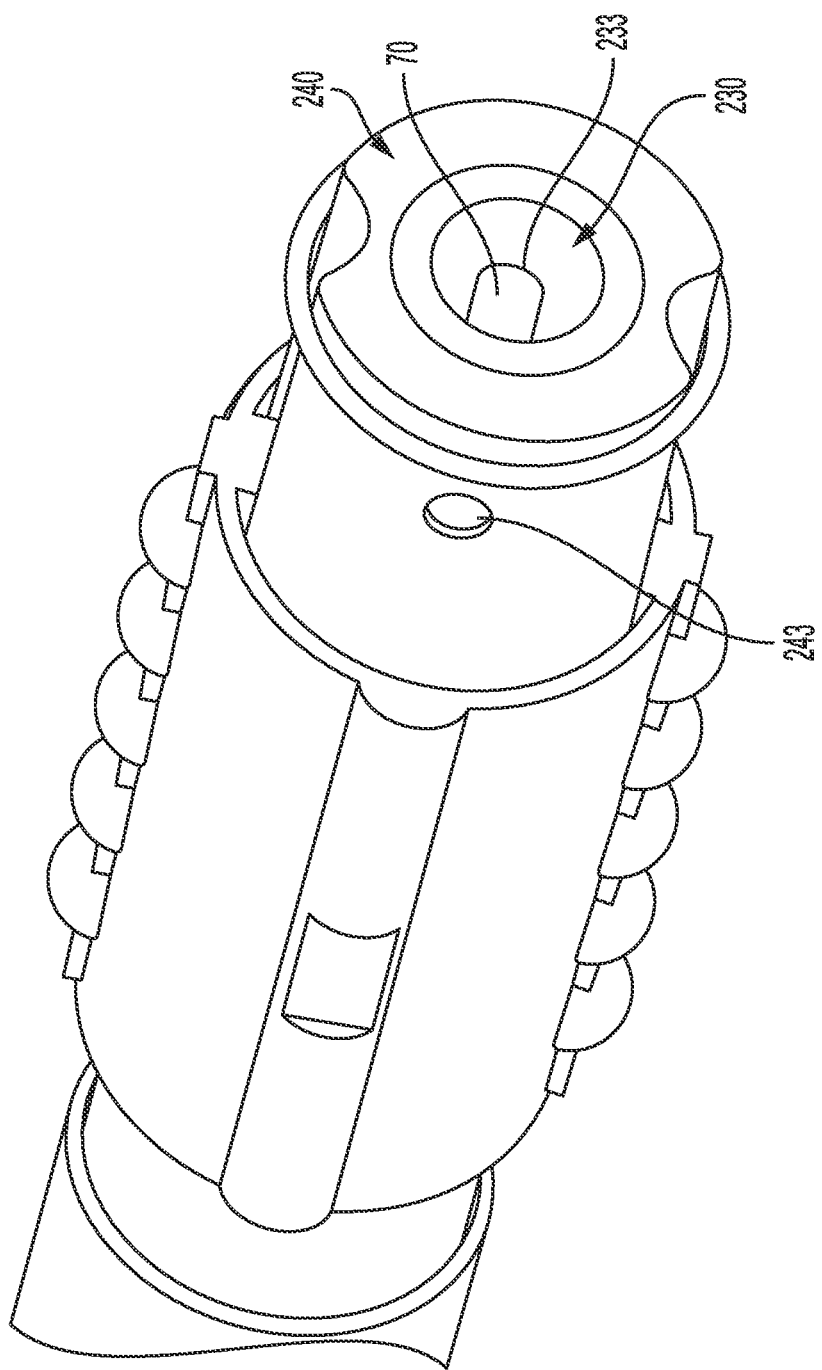
FIG. 5 is another perspective view of an intermediate shaft assembly according to another aspect.

As shown in FIG. 5, in another aspect, a radially inner surface of the sleeve 240 can be entirely circular and a radially outer surface of the second shaft 230 can also entirely circular. In this aspect, a separately formed locking element 70 can be provided that is configured to secure the sleeve 240 to the second shaft 230. The locking element 70 can extend between the second shaft 230 and the sleeve 240. In one aspect, the locking element 70 can be a pin configured to extend between openings in the second shaft 230 and the sleeve 240. The locking element 70 can include any element, piece, or component that generally can be used to prevent relative movement between the second shaft 230 and the sleeve 240. In one aspect, the locking element is provided in an axial region between the securing element 60 and the bearing assembly 50. One of ordinary skill in the art would understand that the exact location of the locking element 70 can vary.

As shown in FIG. 6, the intermediate shaft assembly 10', 10" is shown in two different positions. The intermediate shaft assembly 10' on the left corresponds to a tilted cabin position, while the intermediate shaft assembly 10" on the right corresponds to a normal cabin position. A terminal end of the second shaft is configured to connect to a steering wheel assembly 15.

One of ordinary skill in the art would understand that the interface or mating feature between the sleeve 40, 140, 240 and the second shaft 30, 130, 230 can vary and be achieved in a variety of different configurations.

As disclosed herein, the sleeve 40, 140, 240 is provided to define the raceway of the rolling elements 52. This configuration provides manufacturing efficiencies in that only the sleeve 40, 140, 240 is heat treated, in one aspect, to provide sufficient hardness for the rolling element raceway defined thereon. This configuration avoids requiring a heat treatment for the entire second shaft 30, 130, 230 and instead limits the process to the sleeve 40, 140, 240.

A method of assembling an intermediate shaft assembly 10 is also disclosed. The method includes providing a first shaft 20 defining a cavity 22 and a first bearing raceway 24, and providing a second shaft 30. The method includes fixing a sleeve 40 onto an axial end 32 of the second shaft 30, and the sleeve 40 defines a second bearing raceway 42. The method also includes providing a bearing assembly 50 including at least two rows of rolling elements 52 and a cage 54, and arranging the bearing assembly 50 around the second bearing raceway 42 of the sleeve 40. The method includes inserting the second shaft 30, the sleeve 40, and the bearing assembly 50 at least partially within the cavity 22 of the first shaft 20. Additional steps for the method may be included, such as installing a securing element 60 or locking element 70.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS intermediate shaft assembly 10
steering wheel assembly 15
first shaft 20
cavity 22
first bearing raceway 24
second shaft 30, 130, 230
shoulder 31
axial end 32 of the second shaft
openings 233 first curved sections 34a, 34b
first flat section 134a, 134b
circumferential curved sections 34c, 34d, 134c, 134d
sleeve 40, 140, 240
axial end 41 of the sleeve
second bearing raceway 42
openings 243
second curved sections 44a, 44b
second flat section 144a, 144b
circumferential curved sections 44c, 44d, 144c, 144d
bearing assembly 50
rolling elements 52
cage 54
securing element 60
locking element 70

What is claimed is:

1. An intermediate shaft assembly for a steering column, the intermediate shaft assembly comprising:
    a first shaft defining a cavity and a first bearing raceway;
    a second shaft arranged at least partially within the cavity of the first shaft;
    a sleeve arranged on an axial end of the second shaft and defining a second bearing raceway; and
    a bearing assembly including at least two rows of rolling elements and a cage, wherein the rolling elements are supported between the first bearing raceway of the first shaft and the second bearing raceway of the sleeve, and wherein the second shaft includes a shoulder that defines an axial stop for the bearing assembly.

2. The intermediate shaft assembly according to claim 1, further comprising a securing element arranged on an axial end of the sleeve and configured to retain the bearing assembly on the sleeve.

3. The intermediate shaft assembly according to claim 2, wherein the securing element comprises a snap ring.

4. The intermediate shaft assembly according to claim 1, wherein the sleeve is heat treated.

5. The intermediate shaft assembly according to claim 1, wherein the sleeve is formed from sheet metal.

6. The intermediate shaft assembly according to claim 1, wherein the sleeve is secured to the axial end of the second shaft by a direct rotational connection such that the sleeve is rotationally fixed to the second shaft.

7. The intermediate shaft assembly according to claim 6, wherein the direct rotational connection is formed via at least one first curved section formed on the second shaft that is configured to mate with at least one second curved section formed on the sleeve such that the sleeve and the second shaft are rotationally connected with each other.

8. The intermediate shaft assembly according to claim 7, wherein the at least one first curved section and the at least one second curved section include an indented curved profile that generally extends radially inwards.

9. The intermediate shaft assembly according to claim 8, wherein the at least one first curved section includes two first curved sections that are connected to each other via a pair of circumferential curved sections, and the at least one second curved section includes two second curved sections that are connected to each other via a pair of circumferential curved sections.

10. The intermediate shaft assembly according to claim 6, wherein the direct rotational connection is formed via at least one first flat section formed on the second shaft that is configured to mate with at least one second flat section formed on the sleeve such that the sleeve and the second shaft are rotationally connected with each other.

11. The intermediate shaft assembly according to claim 1, wherein the sleeve and the second shaft engage with each other in respective regions having a circular profile, and the sleeve is secured to the second shaft via a locking element.

12. The intermediate shaft assembly according to claim 11, wherein the locking element includes a pin that extends transversely through openings in the sleeve and the second shaft.

13. An intermediate shaft assembly for a steering column, the intermediate shaft assembly comprising:
    a first shaft defining a cavity and a first bearing raceway;
    a second shaft arranged at least partially within the cavity of the first shaft;
    a sleeve arranged on an axial end of the second shaft and defining a second bearing raceway, the sleeve being fixed to the axial end of the second shaft via a coupling feature; and
    a bearing assembly including at least two rows of rolling elements and a cage, wherein the rolling elements are supported between the first bearing raceway of the first shaft and the second bearing raceway of the sleeve.

14. The intermediate shaft assembly according to claim 13, wherein the coupling feature includes a pair of mating surfaces formed on the sleeve and the second shaft, wherein the pair of mating surfaces are configured to rotationally fix the sleeve to the second shaft.

15. The intermediate shaft assembly according to claim 14, wherein the pair of mating surfaces include a pair of radial protrusions.

16. The intermediate shaft assembly according to claim 13, wherein the coupling feature includes a separately formed locking element extending transversely through the sleeve and the second shaft.

17. The intermediate shaft assembly according to claim 13, wherein the sleeve is heat treated and formed from sheet metal.

18. The intermediate shaft assembly according to claim 13, further comprising a securing element arranged on an axial end of the sleeve and configured to retain the bearing assembly on the sleeve, the securing element comprising a snap ring.

19. A method of assembling an intermediate shaft assembly, the method comprising:
    providing a first shaft defining a cavity and a first bearing raceway, and providing a second shaft;
    fixing a sleeve onto an axial end of the second shaft via a coupling feature, the sleeve defining a second bearing raceway;
    providing a bearing assembly including at least two rows of rolling elements and a cage, and arranging the bearing assembly around the second bearing raceway of the sleeve; and
    inserting the second shaft, the sleeve, and the bearing assembly at least partially within the cavity of the first shaft.

20. The method of claim 19, wherein:
    the coupling feature includes a pair of mating surfaces formed on the sleeve and the second shaft, wherein the pair of mating surfaces are configured to rotationally fix the sleeve to the second shaft; or
    the coupling feature includes a separately formed locking element extending transversely through the sleeve and the second shaft.

* * * * *